United States Patent [19]

Hart et al.

[11] Patent Number: 5,433,547
[45] Date of Patent: Jul. 18, 1995

[54] SHACKLE WITH LOCK PIN

[76] Inventors: Judy L. Hart, 2322 37th SW., Seattle, Wash. 98126; William A. Munday, P.O. Box 15611, Seattle, Wash. 98115

[21] Appl. No.: 199,570

[22] Filed: Feb. 22, 1994

[51] Int. Cl.6 ............................................. F16D 1/00
[52] U.S. Cl. .................................... 403/24; 403/154; 59/86
[58] Field of Search ............... 403/24, 154, 156, 79, 403/325, 327, 329, 92, 93; 411/145, 146, 141, 949; 59/86

[56] References Cited

U.S. PATENT DOCUMENTS

| | | |
|---|---|---|
| 270,372 | 1/1883 | Beeman . |
| 285,962 | 10/1883 | Bracken . |
| 325,221 | 8/1885 | Wright ............... 403/154 X |
| 453,222 | 6/1891 | Unckrich . |
| 612,046 | 10/1898 | Mathews et al. . |
| 615,367 | 12/1898 | Sattes . |
| 618,086 | 1/1899 | Haase . |
| 727,716 | 5/1903 | Uren . |
| 809,511 | 1/1906 | Lien . |
| 1,002,120 | 8/1911 | Berner . |
| 1,419,974 | 6/1922 | McLaughlin . |
| 1,646,546 | 10/1927 | Larsen . |
| 2,097,465 | 11/1937 | Morrison ............... 59/86 |
| 2,124,912 | 7/1938 | Ehmann ............... 59/86 |
| 3,754,418 | 8/1973 | Miller ............... 70/18 |
| 3,816,009 | 6/1974 | Schenk ............... 403/325 X |
| 4,102,124 | 7/1978 | Swager ............... 59/86 |
| 4,423,610 | 1/1984 | Hart et al. ............... 70/18 |
| 4,880,331 | 11/1989 | Zun ............... 403/24 |
| 4,929,113 | 5/1990 | Sheu ............... 403/325 X |
| 5,114,260 | 5/1992 | Hart et al. ............... 403/154 X |

FOREIGN PATENT DOCUMENTS 13369 of 1910 United Kingdom .
2080478 2/1982 United Kingdom .

Primary Examiner—Dave W. Arola
Assistant Examiner—Harry C. Kim
Attorney, Agent, or Firm—David P. Campbell

[57] ABSTRACT

A shackle including a clevis (10) and a lock pin (12). Clevis (10) includes eyes (16, 18). Eye (16) includes ramps (30). Lock pin (12) includes a head portion (42), radial flange (48), shank (46), coil spring (62), and lock member (60). Lock member (60) includes detents (64, 66) adapted to engage ramps (30). Coil spring (62) biases lock member (60) toward flange (48) so that detents (64, 66) are in a "lock" position and engage ramps (30) when lock pin (12) is threaded into eyes (16, 18).

12 Claims, 3 Drawing Sheets

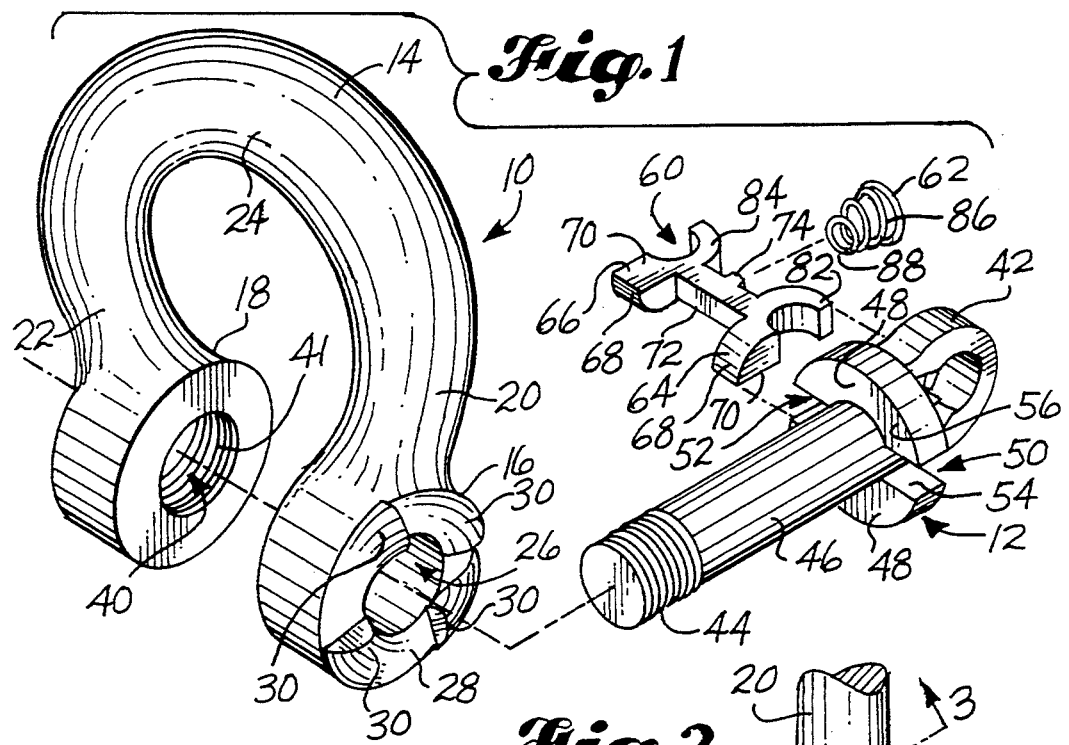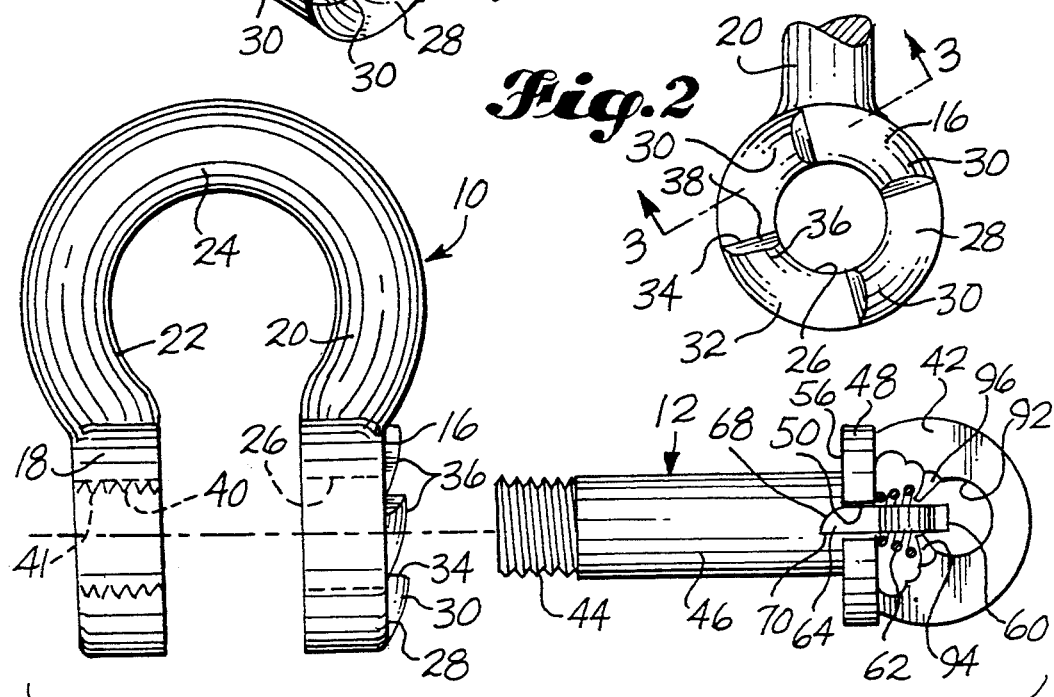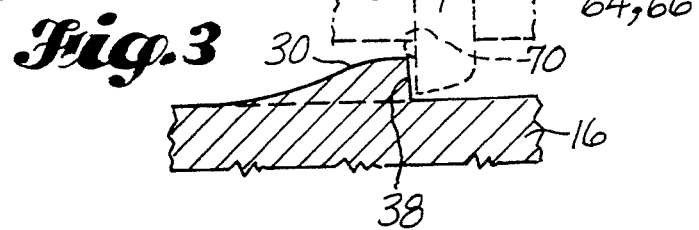

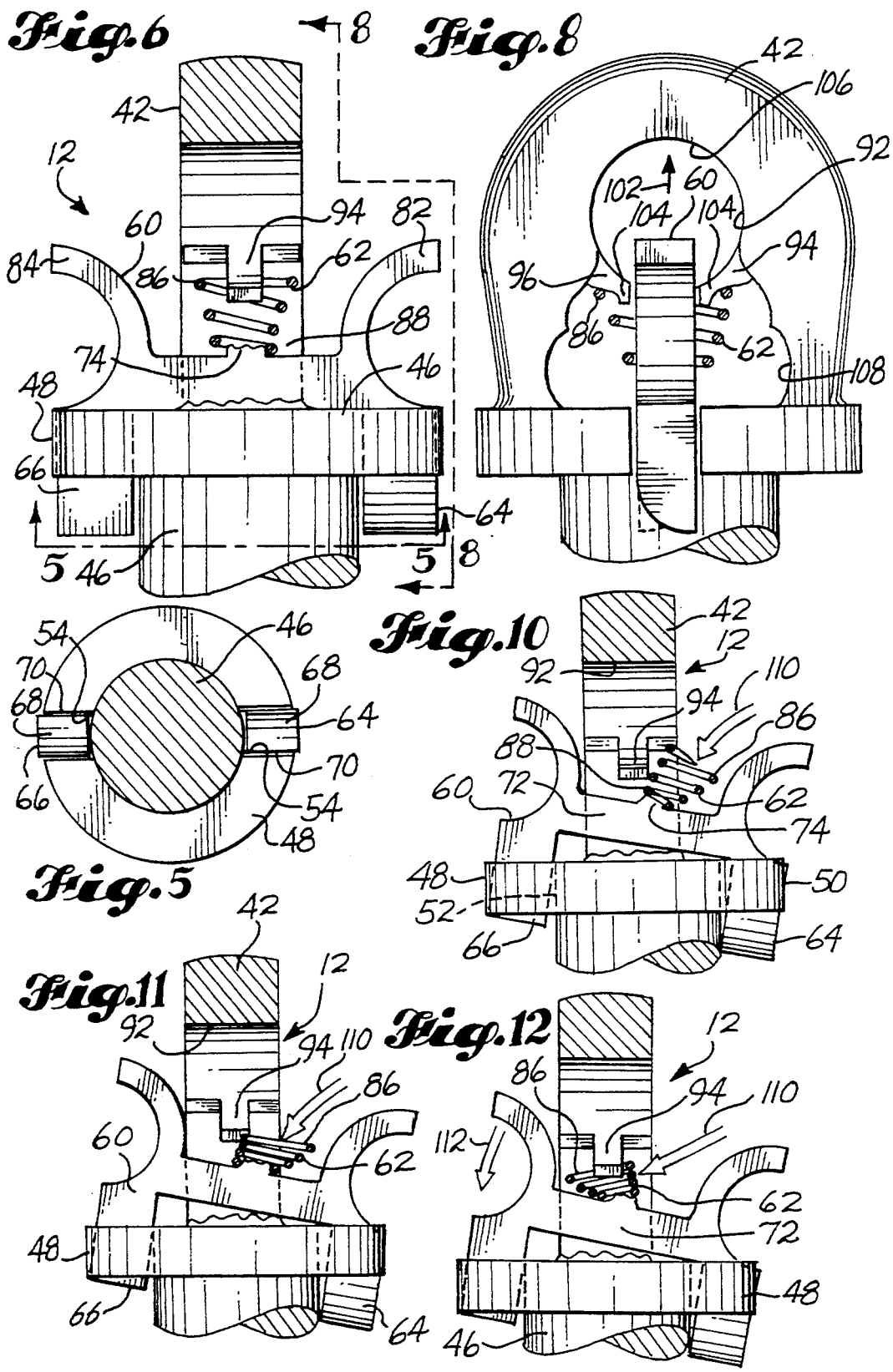

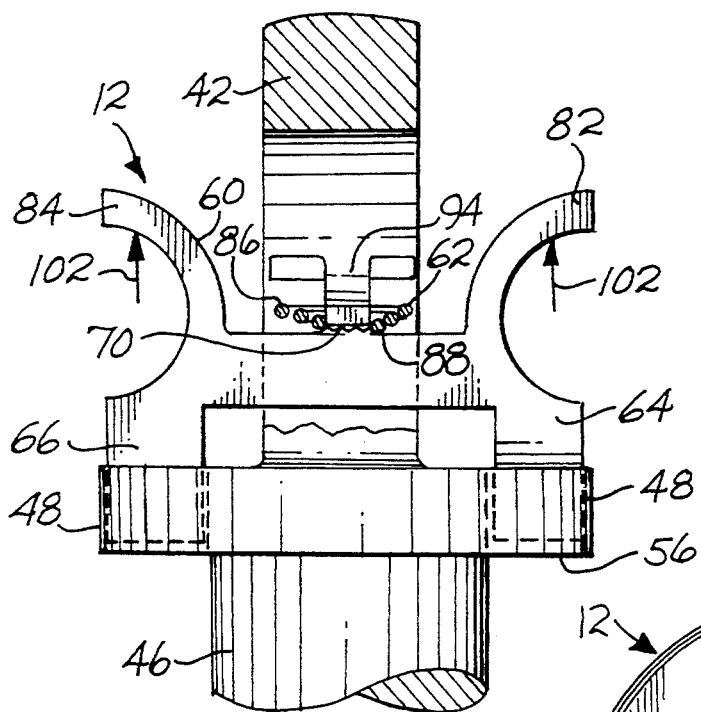
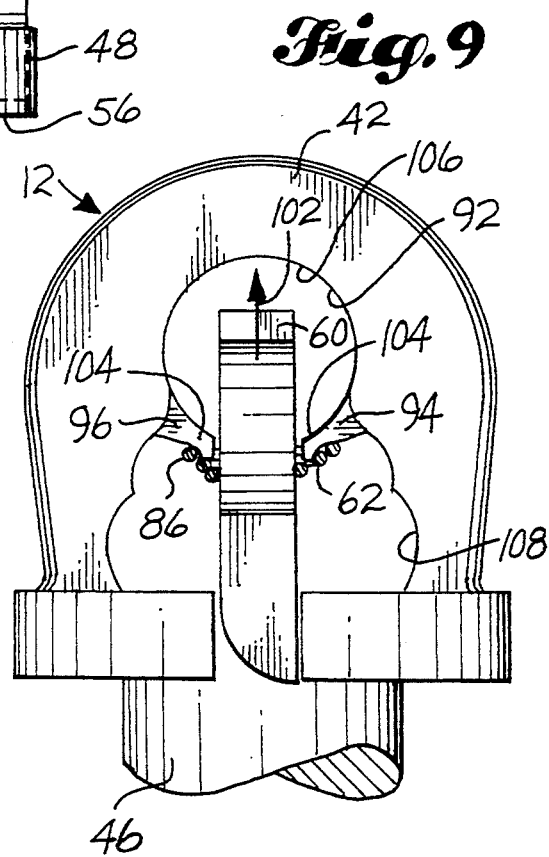

SHACKLE WITH LOCK PIN

TECHNICAL FIELD

This invention relates to shackles having a substantially U-shaped clevis closed by a pin that extends through aligned openings in eyes of the clevis. More particularly, it relates to the provision of a simple, but effective, lock mechanism for such type of shackle, which lock mechanism is easy to assemble and operate.

BACKGROUND OF THE INVENTION

Pin and clevis-type shackles that include a lock for preventing unwanted disengagement of the pin from the clevis are disclosed by the following U.S. patent numbers: U.S. Pat. No. 2,097,465, granted Nov. 2, 1937, to William D. Morrison; U.S. Pat. No. 3,754,418, granted Aug. 28, 1973, to Peter B. Miller; U.S. Pat. No. 4,423,610, granted Jan. 3, 1984, to Judy L. Hart and William A. Munday; and U.S. Pat. No. 5,114,260, granted May 19, 1992, to Judy L. Hart and William A. Munday. These patents should be considered in order to put the present invention into proper perspective.

With pin-and-clevis type shackles, it is desirable to have a clevis that easily can be locked and unlocked. It also is desirable that the shackle be assembled easily, yet be durable in structure. The present invention is directed to such a shackle.

Our prior U.S. Pat. No. 5,114,260 discloses a pin-and-clevis shackle having a lock mechanism. The lock mechanism includes a lock member that is biased into a lock position by a leaf spring. The lock member includes a pair of rounded side portions that act as handles to assist in retracting the lock member into an "unlocked" position, against increasing resistance of the leaf spring. The present invention is an improvement upon this design.

DISCLOSURE OF THE INVENTION

Briefly described, the shackle of the present invention comprises a substantially U-shaped clevis having a closed end and an open end. First and second spaced eyes are provided at the open end. The first eye includes a first opening, and the second eye includes an internally-threaded second opening in axial alignment with the first opening. The first eye further includes an outer face and a plurality of lock ramps on the outer face. The lock ramps are spaced circumferentially about the first opening. Each lock ramp has a first end substantially flush with the outer surface, a second end spaced circumferentially from the first end and outwardly from the face, an inclined surface extending from the first end to the second end, and an end surface at the second end extending substantially outwardly from the outer face. A closure pin is provided comprising a head portion, a radial flange, and a shank extending axially from the radial flange. The shank includes a threaded end portion opposite the flange. A releasable lock member is carried by the closure pin. The releasable lock member includes a plurality of detents, each adapted to extend axially towards the threaded end of the shank. Each detent has a first position in which it extends axially beyond the radial flange toward the shank, and a second position in which it does not extend axially beyond the radial flange. A coil spring is provided between the head portion of the closure pin and the lock member for biasing the lock member endwise of the closure pin, towards the threaded end of the shank, to place the detents into their first position. The releasable lock member is retractable against the force of the coil spring an amount sufficient to retract each detent into its second position. In use, the closure pin is inserted into and through the first opening, and toward the second opening, so that the threaded end portion of the shank engages the internal threads of the second eye. The closure pin is then rotated to screw the threaded end portion of the shank into the threaded second opening. During such rotation, the detents contact the inclined surfaces of the lock ramps and by such contact are retracted. When the closure pin is connected to the clevis, a reverse rotation of the closure pin is prevented by contact of the detent with the end surfaces of the lock ramps. The closure pin is removed from the clevis by retracting the lock member against the force of the coil spring to retract the detents into the second position while rotating the closure pin in a reverse direction.

Preferably, the coil spring is spiralled so that the coils of the spring nest, and the coil spring, when compressed, provides a substantially constant resistance against retraction of the lock member. This is an important feature of the present invention, for it allows the lock member to be easily operated to move between first and second positions.

According to another aspect of the invention, the head portion of the pin includes a through opening for receiving the releasable lock member. The releasable lock member includes a bridge adapted to extend through the through opening of the head portion for engaging one end of the coil spring. The head portion includes a pair of opposed tabs extending inwardly into the through opening of the head portion, each tab positioned to engage a side edge of the other end of the coil spring. Preferably, the widest diameter coil engages the tabs, and the narrowest diameter coil engages the lock member.

According to another aspect of the invention, the tabs each include a rim projecting toward the flange. The rim includes an underside surface adapted to engage the inner side of a coil of the coil spring and stabilize one end of the spring. The tabs are positioned to form a gap therebetween. The lock member has minimal width to allow the lock member to move through the gap when the lock member is removed from the closure pin. Preferably, the tabs are positioned approximately midway of the through opening in the head so as to divide the through opening into an upper region and lower region. The lock member is carried within the lower region. The design of the head portion and the coil spring allows the coil spring to be easily assembled and disassembled with the lock pin, such as when the coil spring needs replacement.

According to another aspect of the invention, the height of the upper region of the through opening provides the through opening with sufficient height to allow the lock member to be removed from the closure pin.

According to another aspect of the invention, the lock member includes a pair of concave handle bars, one at each end of the lock member, so that a handle bar is positioned on each side of the head portion when the lock member is carried by the closure pin.

According to another aspect of the invention, the bridge includes a ridge of sufficient width to extend into and engage the inner sides of an end coil of the coil spring and stabilize one end of the spring.

According to another aspect of the invention, the through opening of the head portion of the closure pin defines a flat surface coplanar with the radial flange. The bridge of the lock member is adapted to engage the flat surface when the detents are in their first position.

According to another aspect of the invention, the detents of the lock member are spaced from one another approximately the same distance as the diameter of the shank of the closure pin, so that, with its detents in their first position, the lock member is restrained by the shank from radial movement.

Preferably, the detents each have an angled outer end surface, which is adapted to engage the inclined surfaces of the ramps as the closure pin is threaded into the second opening of the second eye, providing minimal resistance to rotation of the closure pin.

According to another aspect of the invention, each ramp includes an outer peripheral edge that is rounded to form a smooth surface between the ramp and the outer peripheral edge of the first eye.

According to another aspect of the invention, the radial flange includes a pair of outwardly opening radial slots, at diametrically opposite locations on the flange, and the lock member includes two detents, one positioned in each slot.

BRIEF DESCRIPTION OF THE DRAWINGS

Like reference numerals are used to designate like parts throughout the several figures of the drawing, and:

FIG. 1 is an exploded pictorial view of a shackle constituting a preferred embodiment of the invention, such view showing the lock pin portion of the shackle spaced from the clevis portion of the shackle, along a bent axis line, and further showing a lock member and a coil spring, which are carried by the lock pin, spaced from the lock pin;

FIG. 2 is a fragmentary elevational view of the outer face of one of the eyes of the clevis, showing the lock ramps;

FIG. 3 is a sectional view taken substantially along line 3—3 of FIG. 2, such view including a phantom line showing of a detent that is the part of a lock member carried by the lock pin;

FIG. 4 is an elevational view of the shackle, showing the lock pin spaced endwise of its connected position with the clevis, and showing a portion of the clevis in section;

FIG. 5 is a sectional view taken substantially along line 5—5 of FIG. 6, showing the detents of the lock pin and the outer slots of the radial flange;

FIG. 6 is a fragmentary view, partially in section, and partially in side elevation, in the head region of the lock pin;

FIG. 7 is a view like FIG. 6 showing the coil spring compressed and the lock member raised;

FIG. 8 is a view like FIG. 6, taken from the aspect of lines 8—8 of FIG. 6;

FIG. 9 is a view like FIG. 8 showing the coil spring compressed and the lock member raised;

FIGS. 10-12 are a sequence of views like FIG. 6 showing steps for inserting the lock member and coil spring onto the head portion of the lock pin.

BEST MODE FOR CARRYING OUT THE INVENTION

Referring to FIG. 1, the shackle of the present invention comprises only two separable components, a clevis 10 and a lock pin 12. Clevis 10 is a substantially U-shaped member having a closed end 14 and an open end defined by and between a pair of eyes 16, 18. The eyes 16, 18 are at the ends of a pair of arms 20, 22. At the closed end 14 of clevis 10, the arms 20, 22 are interconnected by a bight 24.

Eye 16 includes an opening 26, which is herein referred to as the first opening. Eye 16 also includes an outer face 28 on which is formed a plurality of ramps 30. Four ramps 30 are preferred, but the number of ramps can vary.

As best shown by FIG. 2, ramps 30 are spaced circumferentially about the face 28. Each ramp 30 includes a first end 32 that is substantially flush with the outer face 28, a second end 34, which is spaced both circumferentially from the first end 32 and axially outwardly from the face 28, an inclined surface 36, which extends from first end 32 to the second end 34, and an end surface 38 at the second end 34, which extends out from the face 28. Preferably, end surface 38 extends substantially perpendicular to the plain of the face 28. The first and second ends 32, 34, inclined surfaces 36, and end surfaces 38 are labeled for only one of the ramps in FIG. 2. Each ramp 30 has equivalent features.

Referring back to FIG. 1, the second eye 18 is like first eye 16, except that the ramps 30 are omitted and its central opening 40 is smaller than opening 26 and includes internal threads 41, whereas opening 26 is smooth. Openings 26 and 40 are in coaxial alignment.

The lock pin 12 has a head portion 42 at one end and a threaded portion 44 at the opposite end. Threaded portion 44 is a part of a shank 46, which extends axially from a radial flange 48. Flange 48 is positioned axially between head portion 42 and shank 46. In preferred form, flange 48 includes a pair of outwardly-opening radial slots 50, 52. Slots 50, 52 each include inner surfaces 54 and end surface 56. The slots 50, 52 are located at diametrically-opposed locations on the flange 48.

Lock pin 12 includes a lock member 60 and a coil spring 62. Lock member 60 includes a pair of detents 64, 66. Each detent 64, 66 includes a curved, smooth bottom surface 68. The curved surfaces 68 of the detents face in opposite directions. Opposite the curved surfaces 68, each detent includes a flat back surface 70. A bridge 72 connects the two detents 64, 66. A spring retainer ridge 74 is centered on the upper side of bridge 72 between a pair of handles 82, 84. Handles 82, 84 are C-shaped and are provided so that an operator can grip and maneuver the lock member 60. Coil spring 62 has a wider diameter upper end coil 86 and a narrower diameter lower end coil 88.

As shown in FIG. 3, a detent, either detent 64 or detent 66, is adapted to engage a ramp 30 of eye 16. Upon engagement, the back side 70 of the detent 64, 66 confronts and engages an end surface 38 of ramp 30. Engagement of back surface 70 with end surface 38 prevents relative rotation of the lock pin and the clevis.

FIG. 4 is an assembled view of lock pin 12, with lock pin 12 shown spaced from clevis 10 but in co-axial alignment with openings 26, 40 of eyes 16, 18. Assembled, lock member 60 is positioned within a through opening 92 of head portion 42. Detent 64 of lock member 60 extends between and beyond slot 50 of radial flange 48. Head portion 42 includes a pair of retainer fingers 94, 96. Coil spring 62 is held between retainer fingers 94, 96 and the bridge (not shown) of lock member 60. Coil spring 62 functions to bias lock member 60 toward radial flange 48 of the lock pin 12. In this position, the curved surfaces 68 and the flat back surfaces 70 of detents 64, 66 extend axially beyond radial flange 48 as shown in the figure.

Lock pin 12 and clevis 10 are connected in the following manner. Lock pin 12 is picked up and its threaded end portion 44 is moved through opening 26, across the throat of the clevis 10, and into threaded opening 40. Lock pin 12 is then rotated in a clockwise direction. This rotation screws the threads 44 into the threads 40 and moves lock pin 12 axially through the two aligned openings 26, 40. Eventually, the curved surfaces 68 of detents 64, 66 contact the inclined surfaces 36 of ramps 30. When this happens, the contact will move detents 64, 66 and lock member 60 endwise of lock pin 12, towards the head end portion 42 and against the force of coil spring 62. Detents 64, 66 will move relatively up ramps 30 as they retract against the force of coil spring 62. As rotation continues, detents 64, 66 will drop off the second ends 34 of ramps 30 and be moved by coil spring 62 against flange 48. This action will continue until the threads 44 of lock pin 12 are well into the threads 40 of eye 18 and the inner surface 56 of flange 48 is in contact with the second ends 34 of ramps 30. At this point, lock pin 12 is connected to clevis 10. Unwanted reverse rotation of lock pin 12 is prevented by contact between back surfaces 70 of detents 64, 66 and end surfaces 38 of ramps 30, as shown in FIG. 3.

FIG. 5 is an underside view of radial flange 48 and detents 64, 66. The lock member is in its "lock" position. Back surfaces 70 of detents 64, 66 engage inner surfaces 54 of flange 48, and thereby prevent relative rotation between the two.

FIG. 6 illustrates the head portion 42 of lock pin 12, with the lock member 60 in a "lock" position, wherein the detents 64, 66 extend beyond the radial flange 48 of lock pin 12. Coil spring 82 biases lock member 80 against the shank portion 46 of lock pin 12. The narrower diameter lower end coil 88 of coil spring 62 is held against lateral movement by retainer ridge 74 of lock member 60. The larger diameter upper end coil 86 of coil spring 62 is held against lateral movement by retainer fingers 94, 96 (only one of which is shown in FIG. 6).

Handles 82, 84 of lock member 60 are grasped and used to pull lock member 60 axially in the direction of arrow 102 against the force of coil spring 62 in order to raise the detents 64, 66 beyond end surface 56 of radial flange 48. This is shown in FIG. 7. In such a position, lock pin 12 can be rotated counter-clockwise without detents 64, 66 engaging the ramps on the outer surface of the clevis. Coil spring 62 is fully compressed in this "unlock" position. In its compressed position, the coils of spring 62 nest. This allows for full retraction of lock member 60 away from shank 46 and provides a substantially-constant biasing force as the lock member 60 is retracted. This arrangement also simplifies assembly of lock pin 12. The outside diameter of the upper end coil 86 is approximately twice-the diameter of the diameter of the lower end coil 88 of the spring 62. The lower end coil 88 and upper end coil 86 of coil spring 62 comprise fully-closed coil turns. This allows coil spring 62 to be handled easily as lock pin 12 is assembled and when coil spring 62 is replaced.

FIGS. 8 and 9 are views similar to FIGS. 6 and 7, except that they are taken 90° rotated about the head portion 42 of lock pin 12. FIG. 8 shows lock member 60 in a "lock" position, and FIG. 9 shows lock member 60 in a retracted, "unlock" position. The retainer fingers 94, 96 extend inwardly into the through opening 92 of the head portion 42. Each finger 94, 96 is positioned to engage a side edge of the upper end coil 86 of coil spring 62. Retainer fingers 94, 96 each include a rim 104 that projects downwardly toward the flange 48 and into the interiors of end coil 86 of spring 62. Rims 104 allow the fingers 94, 96 to engage inner sides of end coil 86 and thereby stabilize the upper end of the spring and prevent lateral movement thereof. The retainer fingers 94, 96 are spaced from each other to form a gap therebetween, and the width of lock member 60 is minimal enough to allow it to move through the gap between the retainer fingers 94, 96 when lock member 60 is retracted into its "unlock" position. Retainer fingers 94, 96 are positioned approximately midway of the through opening 92 in the head portion 42 and thereby divide the through opening 92 into an upper section 106 and a lower section 108. Lock member 60 is positioned in the lower region 108 when it is in its "lock" position. The height of the upper region 106 of through opening 92 is sufficient to allow lock member 60 to be fully retracted without contacting the upper region of the head portion 42.

FIGS. 10–12 illustrate the steps for assembling lock pin 12. Lock member 60 is inserted through the through opening 92 and between retainer fingers 94, 96, and its detents 64, 66 are positioned in slots 50, 52 of flange 48. Lock member 60 is then raised slightly and cocked to one side, so that its bridge 72 is angled with respect to flange 48. This positions the retainer 74 of bridge 72 into position to receive the lower end coil 88 of coil spring 62, as shown by arrow 110. As shown in FIG. 11, coil spring 62 is then compressed so that its coils nest and its upper end coil 86 passes underneath retainer fingers 94, 96. As shown in FIG. 12, coil spring 62 is then pushed underneath retainer fingers 94, 96 and lock member 60 is lowered so that its bridge 72 rests against the shank portion 46 of lock pin 12, as indicated by arrow 112. As will be readily appreciated, lock member 60 and coil spring 62 are secured firmly to lock pin 12 by the force of coil spring 62. They are separate parts, but when incorporated into the lock pin, they are not readily separable from it. Accordingly, the addition of the pin lock mechanism to the shackle does not add any additional separable parts to the shackle. The shackle essentially includes only two components, the clevis 10 and the lock pin 12. The coil spring 62 is an important part of the invention, along with the design for the lock member 60, which in combination allow the look member to be retracted easily and also allows for the lock member and the coil spring to be easily assembled. The coil spring allows the lock member to be first "halfway" installed, and then the coil spring to be compressed and fit between the retaining structure of the head portion of the lock pin. Such assembly can be quickly performed, either by hand or with a simple tool, such as a screwdriver. As a result, the coil spring can be easily replaced when necessary. The design of the lock member 60 and coil spring 62 also make replacing the coil spring after sufficient wear and tear a relatively simple process.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, our patent is to be limited for this invention only by the following claim or claims interpreted according to accepted doctrines of claim interpretation, including the doctrine of equivalence and reversal of parts.

What is claimed is:

1. A shackle, comprising:

a substantially U-shaped clevis having a closed end and an open end, with first and second spaced eyes at the open end, the first eye including a first opening, and the second eye including an internally-threaded second opening in axial alignment with the first opening, the first eye further including an outer face and a plurality of lock ramps on the outer face, the lock ramps being spaced circumferentially about the first opening, and each lock ramp having a first end substantially flush with the outer surface, a second end spaced circumferentially from the first end and outwardly from the outer face, an inclined surface extending from the first end to the second end, and an end surface at the second end extending substantially outwardly from the outer face, a lock pin comprising a head portion, a radial flange, and a shank extending axially from the radial flange, the shank including a threaded end portion opposite the flange, a releasable lock member carried by the lock pin, including a plurality of detents, each detent adapted to extend axially towards the threaded end of the shank, each detent having a first position in which it extends axially beyond the radial flange toward the shank, and a second position in which it does not extend axially beyond the radial flange, and a coil spring for biasing the lock member endwise of the lock pin, towards the threaded end of the shank, to place the detents into their first position, the releasable lock member being retractable against the force of the coil spring an amount sufficient to retract each said detent into its second position, wherein, in use, the lock pin is inserted into and through the first opening, and toward the second opening, so that the threaded end portion of the shank engages the internal threads of the second eye, and the lock pin is then rotated to screw the threaded end portion of the shank into the threaded second opening, wherein during such rotation, the detents contact the inclined surfaces of the lock ramps and by such contact are retracted, wherein when the lock pin is connected to the clevis, a reverse rotation of the lock pin is prevented by contact of the detent with the end surfaces of the lock ramps, and wherein the lock pin is removed from the clevis by retracting the lock member against the force of the coil spring to retract the detents into the second position while rotating the lock pin in a reverse direction;

wherein the head portion of the lock pin includes a through opening for receiving the releasable lock member, the releasable lock member including a bridge adapted to extend through the through opening of the head portion for engaging one end of the coil spring, the head portion including a pair of opposed tabs extending inwardly into the through opening of the head portion, each tab positioned to engage a side edge of the other end of the coil spring; and wherein the tabs each include a rim projecting toward the flange, the rim including an underside surface adapted to engage the inner side of a coil of the coil spring and stabilize one end of the spring.

2. A shackle according to claim 1, wherein the coil spring is spiralled so that coils of the spring nest creating larger diameter coils and smaller diameter coils, and wherein a largest diameter coil engages the tabs, and a smallest diameter coil engages the lock member.

3. A shackle according to claim 1, wherein the tabs are positioned to form a gap therebetween, the lock member having minimal width to allow the lock member to move through the gap when the lock member is removed from the lock pin.

4. A shackle according to claim 3, wherein the tabs are positioned approximately midway of the through opening in the head so as to divide the through opening into an upper region and lower region, the lock member being carried within the lower region.

5. A shackle according to claim 4, wherein the height of the upper region of the through opening provides the through opening with sufficient height to allow the lock member to be removed from the lock pin.

6. A shackle according to claim 1, wherein the lock member includes a pair of concave handle bars, one at each end of the lock member, so that a handle bar is positioned on each side of the head portion when the lock member is carried by the lock pin.

7. A shackle according to claim 1, wherein the bridge includes a ridge of sufficient width to extend into and engage the inner sides of the coil of the coil spring and stabilize one end of the spring.

8. A shackle according to claim 1, wherein the through opening of the head portion of the lock pin defines a flat surface coplanar with the radial flange, the bridge of the lock member adapted to engage the flat surface when the detents are in their first position.

9. A shackle according to claim 1, wherein the detents of the lock member are spaced from one another approximately the same distance as the diameter of the shank of the lock pin, so that, with its detents in their first position, the lock member is restrained by the shank from radial movement.

10. A shackle according to claim 1, wherein the detents each have a concave outer end surface, which is adapted to engage the inclined surfaces of the ramps as the lock pin is threaded into the second opening of the second eye, providing minimal resistance to rotation of the lock pin.

11. A shackle according to claim 1, wherein said each ramp includes an outer peripheral edge that is rounded to form a smooth surface between the ramp and the outer peripheral edge of the first eye.

12. A shackle according to claim 1, wherein the radial flange includes a pair of outwardly-opening radial slots, at diametrically opposite locations on the flange, and the lock member includes two said detents, one positioned in each slot.

* * * * *